US012490052B2

(12) United States Patent
Balasubramaniam

(10) Patent No.: US 12,490,052 B2
(45) Date of Patent: Dec. 2, 2025

(54) APPARATUS, METHOD AND COMPUTER PROGRAM

(71) Applicant: NOKIA SOLUTIONS AND NETWORKS OY, Espoo (FI)

(72) Inventor: Sankaran Balasubramaniam, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 532 days.

(21) Appl. No.: 17/310,798

(22) PCT Filed: Jan. 24, 2020

(86) PCT No.: PCT/EP2020/051727
§ 371 (c)(1),
(2) Date: Aug. 25, 2021

(87) PCT Pub. No.: WO2020/173629
PCT Pub. Date: Sep. 3, 2020

(65) Prior Publication Data
US 2022/0159414 A1 May 19, 2022

(30) Foreign Application Priority Data
Feb. 25, 2019 (IN) .............................. 201941007258

(51) Int. Cl.
*H04W 4/029* (2018.01)
*H04L 5/00* (2006.01)
*H04W 24/08* (2009.01)

(52) U.S. Cl.
CPC ........... *H04W 4/029* (2018.02); *H04L 5/0048* (2013.01); *H04W 24/08* (2013.01)

(58) Field of Classification Search
CPC ...... H04W 4/029; H04W 24/08; H04L 5/0048
USPC .......................................................... 370/252
See application file for complete search history.

(56) References Cited

U.S. PATENT DOCUMENTS

| 2014/0080489 | A1* | 3/2014 | Siomina ................ H04W 64/00 455/437 |
| 2017/0257840 | A1 | 9/2017 | Wang |
| 2018/0139581 | A1* | 5/2018 | Iun ......................... H04W 72/21 |

(Continued)

FOREIGN PATENT DOCUMENTS

| CN | 101491148 A | 7/2009 |
| KR | 20190008114 A | 1/2019 |
| WO | 2018067380 A1 | 4/2018 |

OTHER PUBLICATIONS

R3-190191 (Year: 2019).*

(Continued)

*Primary Examiner* — Intekhaab A Siddiquee
(74) *Attorney, Agent, or Firm* — Brake Hughes Bellermann LLP

(57) ABSTRACT

There is provided an apparatus, said apparatus comprising means for providing, to at least one distributed unit of a base station from a centralised unit of the base station, an indication to cause at least one measurement relating to an uplink signal from a user equipment to be performed, receiving an indication of a result of the at least one measurement from the at least one distributed unit and providing an indication of the result of the at least one measurement to a location management function.

16 Claims, 10 Drawing Sheets

(56) References Cited

U.S. PATENT DOCUMENTS

2018/0287696 A1  10/2018  Barbieri et al.

OTHER PUBLICATIONS

R3-197283 (Year: 2019).*
R3-192913 (Year: 2019).*
R3-190747 (Year: 2019).*
R3-190748 (Year: 2019).*
First Examination Report for India Application No. 202117037809, mailed on Mar. 7, 2022, 7 pages.
Second Office Action for Chinese Patent Application No. 202080030965.9, mailed on Mar. 1, 2024, 12 pages.
International Search Report and Written Opinion for International Application No. PCT/EP2020/051727, mailed on Apr. 2, 2020, 12 pages.
3GPP TSG-RAN WG3 Meeting #104, R3-192913; "Architecture Impacts for UL-TDOA Positioning"; Agenda item: 19.3; Source: Nokia, Nokia Shanghai Bell; Reno, Nevada, USA; May 13-17, 2019; 4 pages.
3GPP TSG-RAN WG3 #106, R3-197283; "How to Support Positioning Measurements in F1AP"; Agenda Item: 19.5; Source: Ericsson; Reno, Nevada, USA; Nov. 18-22, 2019; 6 pages.
3GPP TSG-RAN WG3 Meeting #103, R3-190191; "NG-RAN Positioning Architecture and Procedures"; Agenda item: 27.2; Source: Qualcomm Incorporated; Athens, Greece; Feb. 25-Mar. 1, 2019; 10 pages.
3GPP TSG RAN WG1 Meeting #87, R1-1611305; "UTDOA Positioning in NB-IOT", Agenda item: 6.2.9.1.3; Source: Nokia, Alcatel-Lucent Shanghai Bell; Reno, Nevada, USA; Nov. 14-18, 2016, 4 pages.
Office Action for Chinese Patent Application No. 202080030965.9, mailed on May 30, 2024, 13 pages.
3GPP TSG-RAN3 Meeting #103; R3-190652; "Discussion on UL Positioning Technique"; Source: Huawei; Agenda Item: 27.2; Athens, Greece; Feb. 25-Mar. 1, 2019; 3 pages.
3GPP TSG-RAN WG3 #103; R3-190748; "Support For Positioning In F1AP"; Source: Ericsson; Athens, Greece; Feb. 25-Mar. 1, 2019; 97 pages.
Office Action for Chinese Patent Application No. 202080030965.9, mailed on Oct. 18, 2024, 17 pages.

* cited by examiner

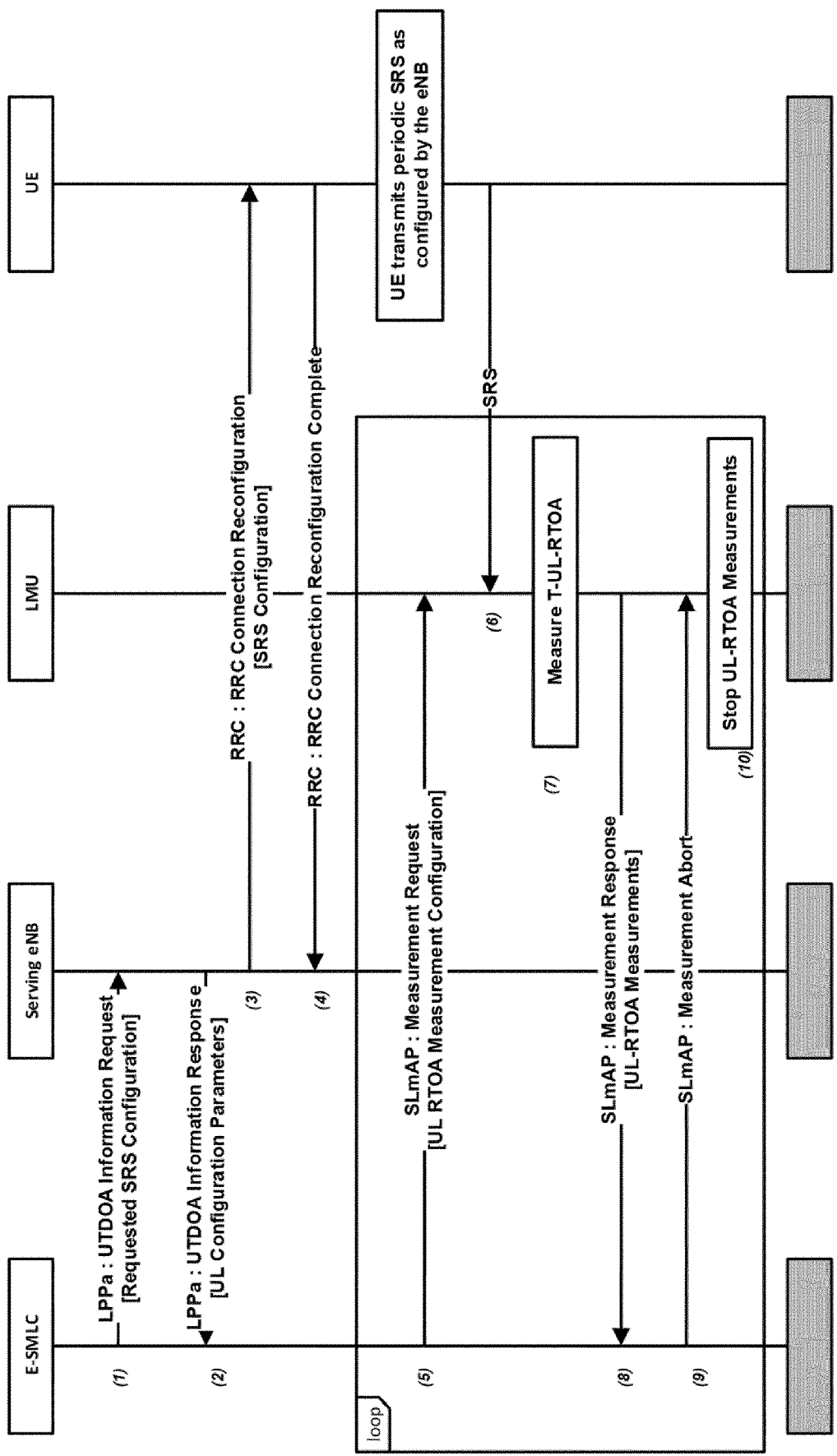

Figure 6

S1: Providing, to at least one distributed unit of a base station from a centralised unit of the base station, an indication to cause at least one measurement relating to an uplink signal from a user equipment to be performed S2: Receiving an indication of a result of the at least one measurement from the at least one distributed unit S3: Providing an indication of the result of the at least one measurement to a location management function

APPARATUS, METHOD AND COMPUTER PROGRAM

CROSS-REFERENCE TO RELATED APPLICATIONS

This application is a national stage entry of International Application No. PCT/EP2020/051727, filed Jan. 24, 2020, entitled "APPARATUS, METHOD AND COMPUTER PROGRAM" which claims the benefit of priority of Indian Application No. 201941007258, filed Feb. 25, 2019, both of which are hereby incorporated by reference in their entireties.

FIELD

The present application relates to a method, apparatus, system and computer program and in particular but not exclusively to an uplink positioning architecture for 5G systems.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus comprising means for providing, to at least one distributed unit of a base station from a centralised unit of the base station, an indication to cause at least one measurement relating to an uplink signal from a user equipment to be performed, receiving an indication of a result of the at least one measurement from the at least one distributed unit and providing an indication of the result of the at least one measurement to a location management function.

The location management function may be integral to the centralised unit of the base station or a central function.

When the location management function is a central function, the interface between the location management function and the centralised unit may use new radio positioning protocol A.

The interface between the centralised unit and the distributed unit may use an F1 application protocol.

The apparatus may comprise means for providing configuration information to at least one user equipment from the centralised unit.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a second aspect there is provided an apparatus comprising means for receiving, at a distributed unit of a base station from a centralised unit of the base station, an indication to cause at least one measurement relating to an uplink signal received from a user equipment to be performed, causing at least one measurement relating to the uplink signal to be performed and providing an indication of a result of the at least one measurement to the centralised unit for provision to a location management function.

The apparatus may comprise means for receiving the result of the at least one measurement from a radio unit, a remote radio head or a standalone measurement unit.

The location management function measurement function may be integral to the centralised unit of the base station or a central function.

The interface between the centralised unit and the distributed unit may use an F1 application protocol.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a third aspect, there is provided a method comprising providing, to at least one distributed unit of a base station from a centralised unit of the base station, an indication to cause at least one measurement relating to an uplink signal from a user equipment to be performed, receiving an indication of a result of the at least one measurement from the at least one distributed unit and providing an indication of the result of the at least one measurement to a location management function.

The location management function may be integral to the centralised unit of the base station or a central function.

When the location management function is a central function, the interface between the location management function and the centralised unit may use new radio positioning protocol A.

The interface between the centralised unit and the distributed unit may use an F1 application protocol.

The method may comprise providing configuration information to at least one user equipment from the centralised unit.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a fourth aspect there is provided a method comprising receiving, at a distributed unit of a base station from a centralised unit of the base station, an indication to cause at least one measurement relating to an uplink signal received from a user equipment to be performed, causing at least one measurement relating to the uplink signal to be performed and providing an indication of a result of the at least one measurement to the centralised unit for provision to a location management function.

The method may comprise receiving the result of the at least one measurement from a radio unit, a remote radio head or a standalone measurement unit.

The location management function measurement function may be integral to the centralised unit of the base station or a central function.

The interface between the centralised unit and the distributed unit may use an F1 application protocol.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a fifth aspect there is provided an apparatus comprising: at least one processor and at least one memory including a computer program code, the at least one memory and computer program code configured to, with the at least one processor, cause the apparatus at least to: provide, to at least one distributed unit of a base station from a centralised unit of the base station, an indication to cause the at least one distributed unit to perform at least one measurement relating to an uplink signal from a user equipment, receive an indication of a result of the at least one measurement from the at least one distributed unit and provide an indication of the result of the at least one measurement to a location management function.

The location management function may be integral to the centralised unit of the base station or a central function.

When the location management function is a central function, the interface between the location management function and the centralised unit may use new radio positioning protocol A.

The interface between the centralised unit and the distributed unit may use an F1 application protocol.

The apparatus may be configured to provide configuration information to at least one user equipment from the centralised unit.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a sixth aspect there is provided an apparatus comprising: at least one processor and at least one memory including a computer program code, the at least one memory and computer program code configured to, with the at least one processor, cause the apparatus at least to: receive, at a distributed unit of a base station from a centralised unit of the base station, an indication to cause at least one measurement relating to an uplink signal received from a user equipment to be performed, cause at least one measurement relating to the uplink signal to be performed and provide an indication of a result of the at least one measurement to the centralised unit for provision to a location management function.

The apparatus may be configured to receive the result of the at least one measurement from a radio unit, a remote radio head or a standalone measurement unit.

The location management function measurement function may be integral to the centralised unit of the base station or a central function.

The interface between the centralised unit and the distributed unit may use an F1 application protocol.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a seventh aspect there is provided a computer readable medium comprising program instructions for causing an apparatus to perform at least the following providing, to at least one distributed unit of a base station from a centralised unit of the base station, an indication to cause the at least one distributed unit to perform at least one measurement relating to an uplink signal from a user equipment, receiving an indication of a result of the at least one measurement from the at least one distributed unit and providing an indication of the result of the at least one measurement to a location management function.

The location management function may be integral to the centralised unit of the base station or a central function.

When the location management function is a central function, the interface between the location management function and the centralised unit may use new radio positioning protocol A.

The interface between the centralised unit and the distributed unit may use an F1 application protocol.

The apparatus may be caused to perform providing configuration information to at least one user equipment from the centralised unit.

The uplink signal may be a reference signal or a physical channel.

The reference signal may be a sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In an eighth aspect there is provided a computer readable medium comprising program instructions for causing an apparatus to perform at least the following receiving, at a distributed unit of a base station from a centralised unit of the base station, an indication to cause at least one measurement relating to an uplink received from a user equipment to be performed, causing at least one measurement relating to the uplink signal to be performed and providing an indication of a result of the at least one measurement to the centralised unit for provision to a location management function.

The apparatus may be caused to perform receiving the result of the at least one measurement from a radio unit, a remote radio head or a standalone measurement unit.

The location management function measurement function may be integral to the centralised unit of the base station or a central function.

The interface between the centralised unit and the distributed unit may use an F1 application protocol.

The uplink signal may be a reference signal or a physical channel.

The reference signal may be a periodic sounding reference signal.

The at least one measurement may relate to uplink relative time of arrival for the uplink signal, uplink angle of departure for the uplink signal, uplink angle of arrival for the uplink signal, received uplink signal power and carrier-phase of the uplink signal.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5 shows a signalling diagram for legacy LTE/EPC uplink positioning;

FIG. 6 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
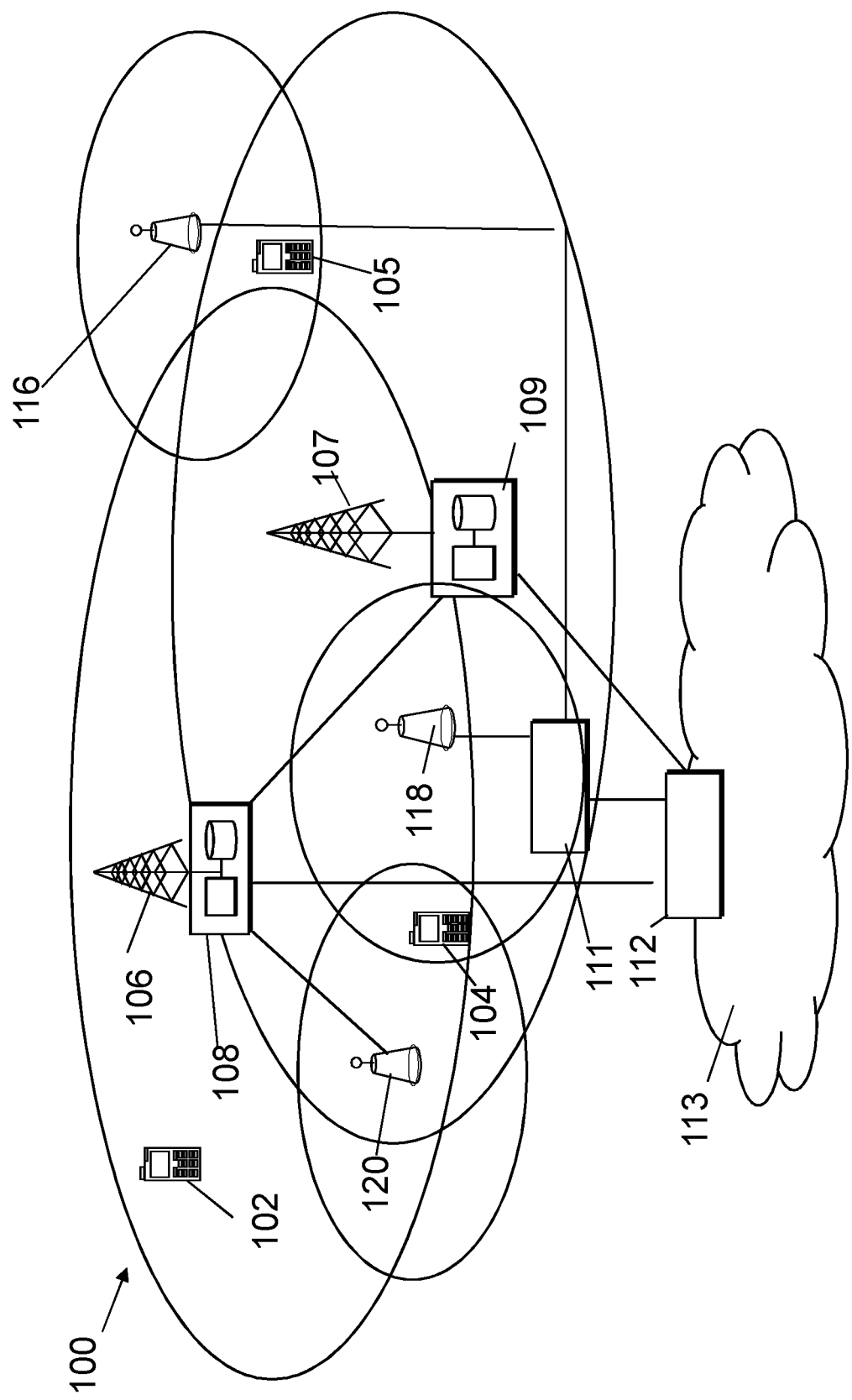
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. New functions are defined in the 5G system architecture, including an Access Management Function (AMF), Session Management Function (SMF), User Plane Function (UPF), among other network functions in the Next Generation Core (NGC). The 5G System supports new capabilities, including network slicing to better tailor networks to application requirements and provide virtual networks for tenants. It also uses a services-based architecture the provides greater flexibility for introducing new services and features compared to the EPC which relied on fixed, peer-peer reference points. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. MR may also support lower latency for air-interface transmission due to revisions in physical and MAC layer protocols.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, by a Centralized Unit (CU) at least partly, in a server, host or node operationally coupled to Distributed Unit (DU), which may connect to a radio unit (RU) or remote radio head (RRH). It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) which may be a PSA (PDU Session Anchor) providing an anchor point for user IP, Ethernet or Unstructured user data sessions. The UPF may be responsible for forwarding frames back and forth between the DN (data network) and the gNBs through tunnels established over transport networks towards the UE(s) that want to exchange traffic with the DN.

The UPF is controlled by an SMF (Session Management Function) that receives policies from a PCF (Policy Control Function). The CN may also include an AMF (Access & Mobility Function) which terminates the control plane interface with the RAN and manages UE registrations and mobility.

Figure 2:
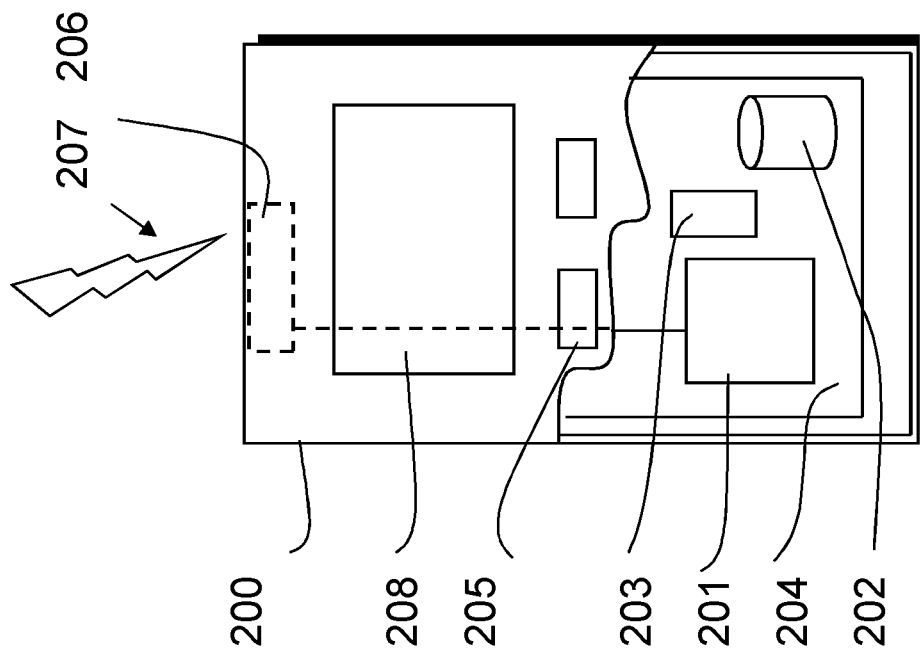
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
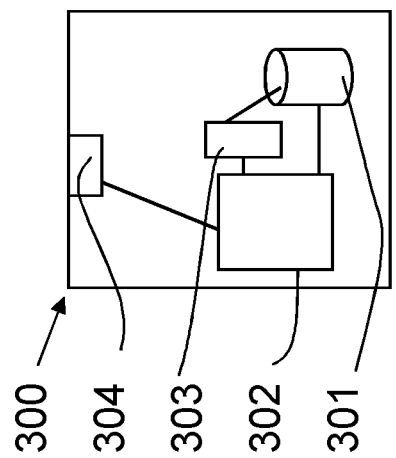
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus, such as a CU Control Plane (CU-CP) as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head (RRH).

Positioning is an important part of Radio Access Networks (RAN). Accurate location knowledge is an important requirement for various services such as emergency services, vehicular related use cases, and factories of the future. Location-based services (e.g., advertisement push, car parking and augmented reality) are also in use.

UTDOA (Uplink Time Difference of Arrival) is a positioning method where a RAN measures the time of arrival of a given UE uplink reference signal simultaneously at multiple, physically separated locations. Based on the measured difference in the times of arrival and the known location of the measuring points, the UE's location is computed. This method has been defined in LTE/EPC and has been agreed in 3GPP as a method for NR based positioning in Rel-16. Other timing based techniques (as well as timing of arrival path(s)), angle-based techniques (e.g., based on the uplink angle of departure or uplink angle of arrival of a UL signal), carrier-phase based techniques or RSRP (received reference signal power) based techniques may also be considered for UL positioning in Rel-16 5G.

Figure 4:
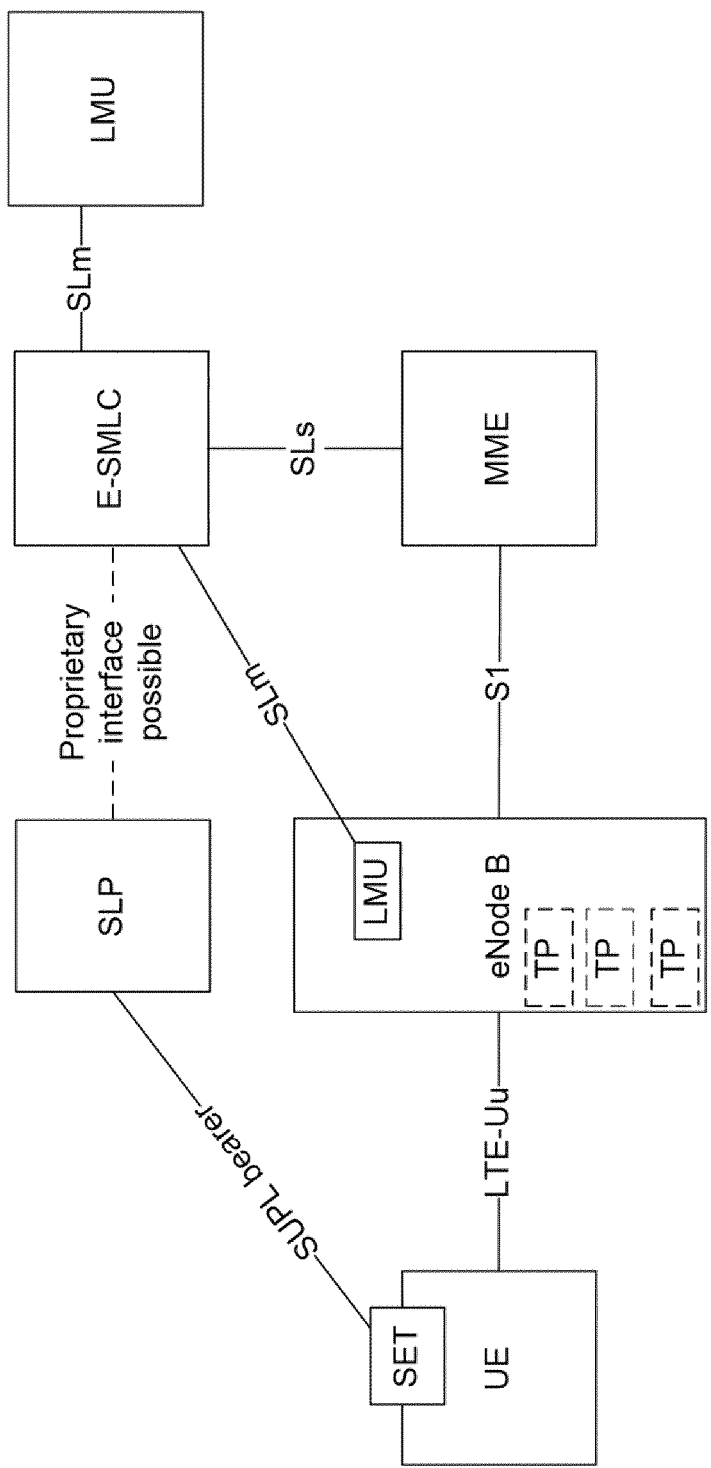
FIG. 4 shows a schematic diagram of legacy LTE/EPC positioning architecture.

FIG. 4 shows a schematic diagram of a positioning (e.g., UTDOA positioning) architecture in LTE/EPC. The architecture includes an entity separate to the MME and the eNodeB called a Location Measurement Unit (LMU). Each measurement location requires a separate LMU to measure UL signals independently & simultaneously. The LMU measures uplink SRS (and provides no other functionality). The LMU may be standalone or co-located in an eNB. A dedicated interface (SLm) between the evolved serving mobile location server (E-SMLC) in the EPC and the LMUs is provided, along with a dedicated protocol (SLmAP) for this interface. SLmAP requires its own procedures (e.g., Setup/Measurements etc.).

Since LTE architecture is not distributed in nature, the separate entity, LMU, is required which, in turn, needs a separate interface and protocol. This may lead to additional effort and/or complexity in standardization and product deployment, to support this positioning method.

SLmAP may require multiple messages to the individual LMU from the E-SMLC. FIG. 5 shows an example signaling diagram for LTE based UTDOA positioning.

In step 1, the E-SMLC sends an UTDOA Information Request (including the requested SRS configuration) to a serving eNB over New Radio Positioning Protocol A (NRPPa) and receives a UTDOA Information Response with the UL configuration parameters over NRPPa in step 2.

In step 3, the serving eNB sends an RRC Connection Reconfiguration which includes SRS configuration to a UE. In step 4, a UE provides an RRC Connection Reconfiguration Complete message to the eNB. The UE then sends periodic SRS as configured by the eNB.

In step 5, the E-SMLC sends a measurement request (which includes the UL RTOA Measurement configuration) to the LMU over SLmAP.

In step 6, the UE sends a SRS which is received at the LMU. The LMU measures the T-UL-RTOA at step 7 and provides a measurement response including the UL-RTOA measurements to the E-SMLC using the SLmAP in step 8.

In step 9, the E-SMLC sends a measurement abort message to the LMU and in step 10 the LMU stops UL-RTOA measurements.

Support of positioning using 5G architecture and NR is being discussed, with multiple work items in SA2, RAN1 and RAN2. One consideration is if LMUs as a separate entity (with its own interface and protocol) are needed in the NG-RAN.

5G architecture is more distributed compared to that of LTE/EPC. As described above, the NG-RAN is defined in a distributed manner with CUs and DUs separated with a common F1 interface between them.

FIG. 6 shows a flowchart of a method according to an example embodiment. The method may be performed at a gNB-CU.

In a first step, S1, the method comprises providing, to at least one distributed unit of a base station from a centralised unit of the base station, an indication to cause at least one measurement relating to an uplink signal from a user equipment to be performed.

In a second step, S2, the method comprises receiving an indication of a result of the at least one measurement from the at least one distributed unit.

In a third step, S3, the method comprises providing an indication of the result of the at least one measurement to a location management function.

Figure 7:
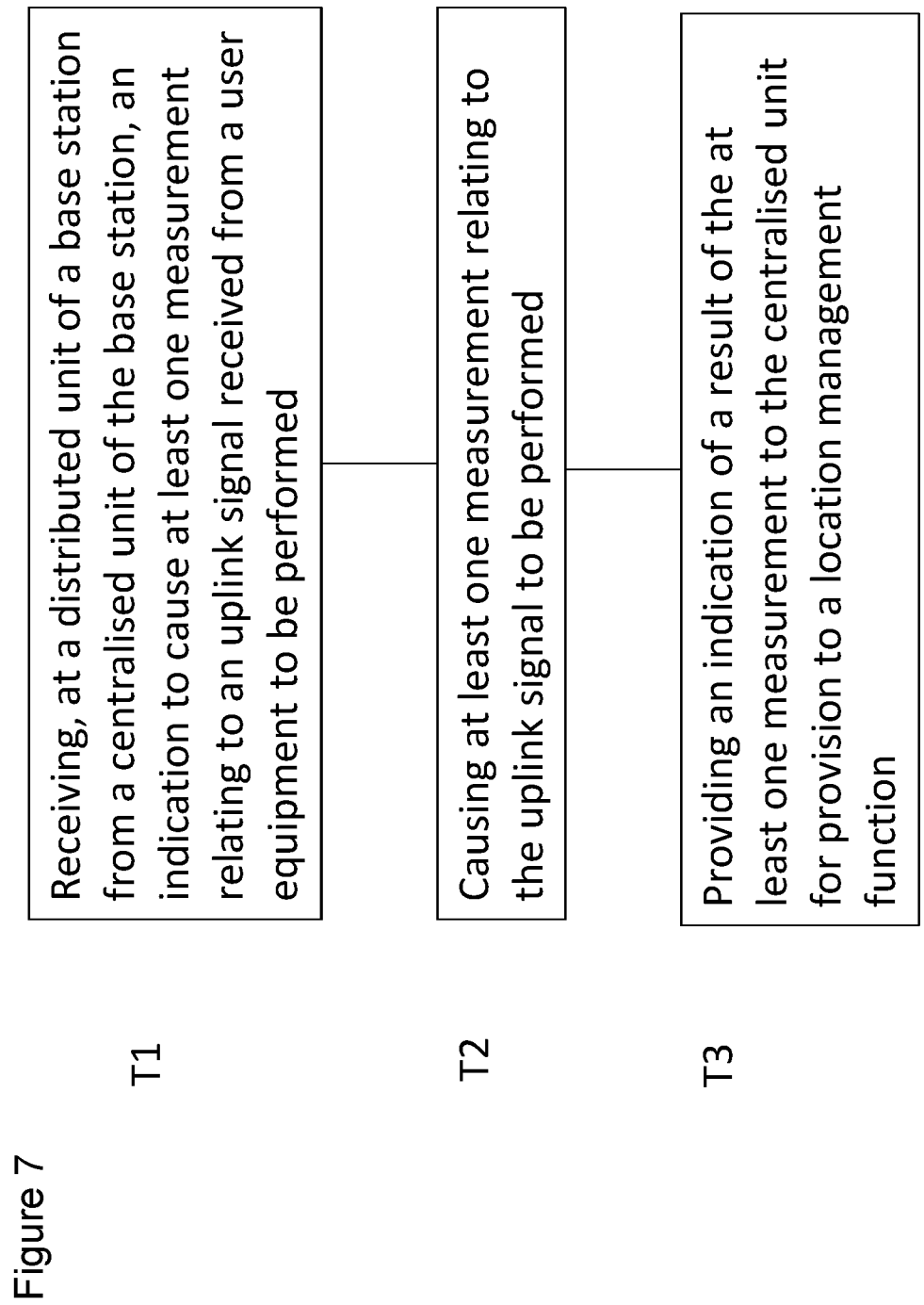
FIG. 7 shows a flowchart of a method according to an example embodiment.

FIG. 7 shows a flowchart of a method according to an example embodiment. The method may be performed at a gNB-DU.

In a first step, T1, the method comprises receiving, at a distributed unit of a base station from a centralised unit of the base station, an indication to cause at least one measurement relating to an uplink signal received from a user equipment to be performed.

In a second step, T2, the method comprises causing at least one measurement relating to the uplink signal to be performed.

In a third step, T3, the method comprises providing an indication of a result of the at least one measurement to the centralised unit for provision to a location management function.

The base station may be a gNB. The centralized unit of the base station may be a gNB-CU and the distributed unit of the base station may be a gNB-DU. The interface between the centralised unit and the distributed unit shall use an F1 application protocol.

The location management function (LMF) may be a central LMF (i.e. located externally to the gNB) or local (i.e., co-located at the base station). A LMF co-located at a gNB is being defined in Rel-16 5G. When the LMF is a central LMF, the interface between the location management function and the centralised unit may use NRPPa.

The uplink signal may be a reference signal or a physical channel (e.g., but not limited to, PRACH). The reference signals may be periodic or aperiodic SRS. The at least one measurement may comprise, for example but not be limited to, a measurement relating to the UL relative time of arrival (T-UL-RTOA), uplink angle of departure for the uplink signal, uplink angle of arrival for the uplink signal, received uplink signal power (e.g. reference signal received power (RSRP)) and carrier-phase of the uplink signal.

The at least one measurement relating to the uplink signal may be caused to be performed at a RU or RRH or a standalone entity connected to the DU. The RU, RRH or standalone unit provide an indication of a result of the at least one measurement to the distributed unit. The DU and the RU, RRH or LMU communicate using the common public radio interface or enhanced common public radio interface (CPRI/eCPRI).

That is, the location measurement unit (LMU) (i.e., where the measurements relating to the uplink signals are performed) may be located within the RRH/RU or may be a standalone entity connected to the DU. In both cases, this would 'hide' the LMU from the location server behind the DU, so that the LMU is not visible to any entity because of the common F1 interface between the DU and the CU. The LMU is thus hidden from the CU or the SGC.

Since the LMU is hidden from the CU and the SGC, there is no need for a standard interface or protocol for the LMF to talk to the LMU. Instead, the already-defined NRPPa and F1AP protocols can be used between the LMF and gNB-CU and from the gNB-CU to the gNB-DU respectively The method may comprise providing configuration information (e.g., SRS configuration) to a UE from the gNB-CU. Compared to the legacy system, which would require an SRS configuration request/response between the LMF and NG-RAN over NRPPa, a single, lightweight message is sent on the NRPPa between the LMF and the gNB-CU (if the LMF is a central LMF). SRS configuration may be sent to the LMF only if needed, for example if the LMF performs a computation or configuration based on the SRS.

The gNB-CU handles uplink signal configuration (e.g., SRS configuration) internally with the DUs. Any change in measurement configuration (e.g., enhancements in the measurements relating to the uplink signals) may be localized to the gNB with no impact in the NRPPa (in contrast to LMU based UL positioning, where any enhancement in the measurements may require change in the configuration in SLmAP). NR SRS configuration may involve more complex configurations (such as beamforming) where it would be advantageous to limit to the RAN The following describes an architecture for UL positioning in 5G networks. The architecture may be used for UL positioning methods where distributed measurements are required.

Figure 8:
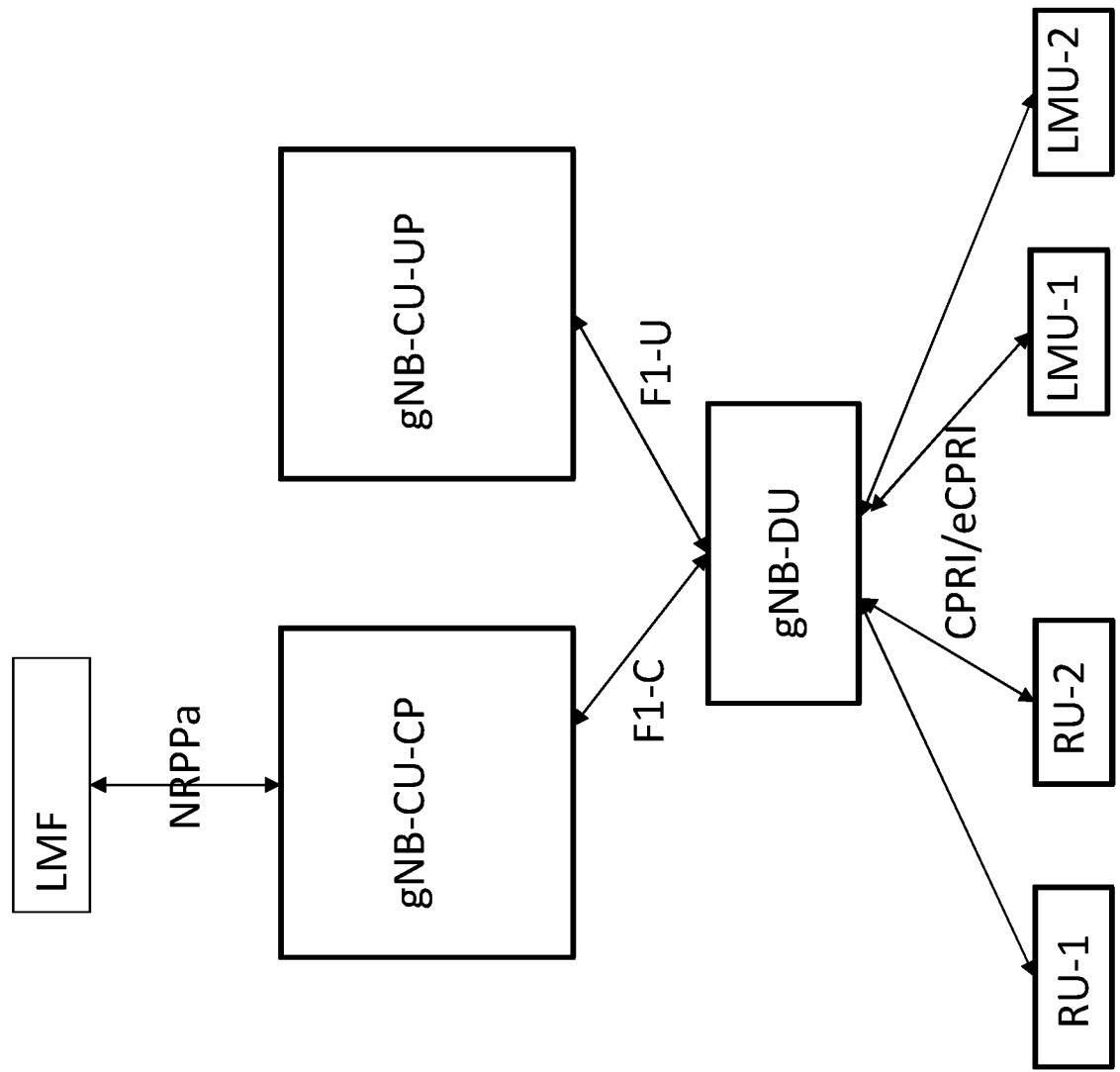
FIG. 8 shows a schematic diagram of NR architecture according to an example embodiment, where the LMU is a standalone entity.

FIG. 8 shows an example architecture where the LMUs comprise standalone LMUs. LMU-1 and LMU-2 communicate with the gNB-DU using the common public radio interface or enhanced common public radio interface (CPRI/eCPRI), as do RU-1 and RU-2. The gNB-DU is in communication with the gNB-CU-CP via F1-C interface and with gNB-CU-UP via F1-U interface.

In the architecture shown in FIG. 8, the LMF is a central LMF and communicates with the gNB-CU-CP using NRPPa.

Figure 9:
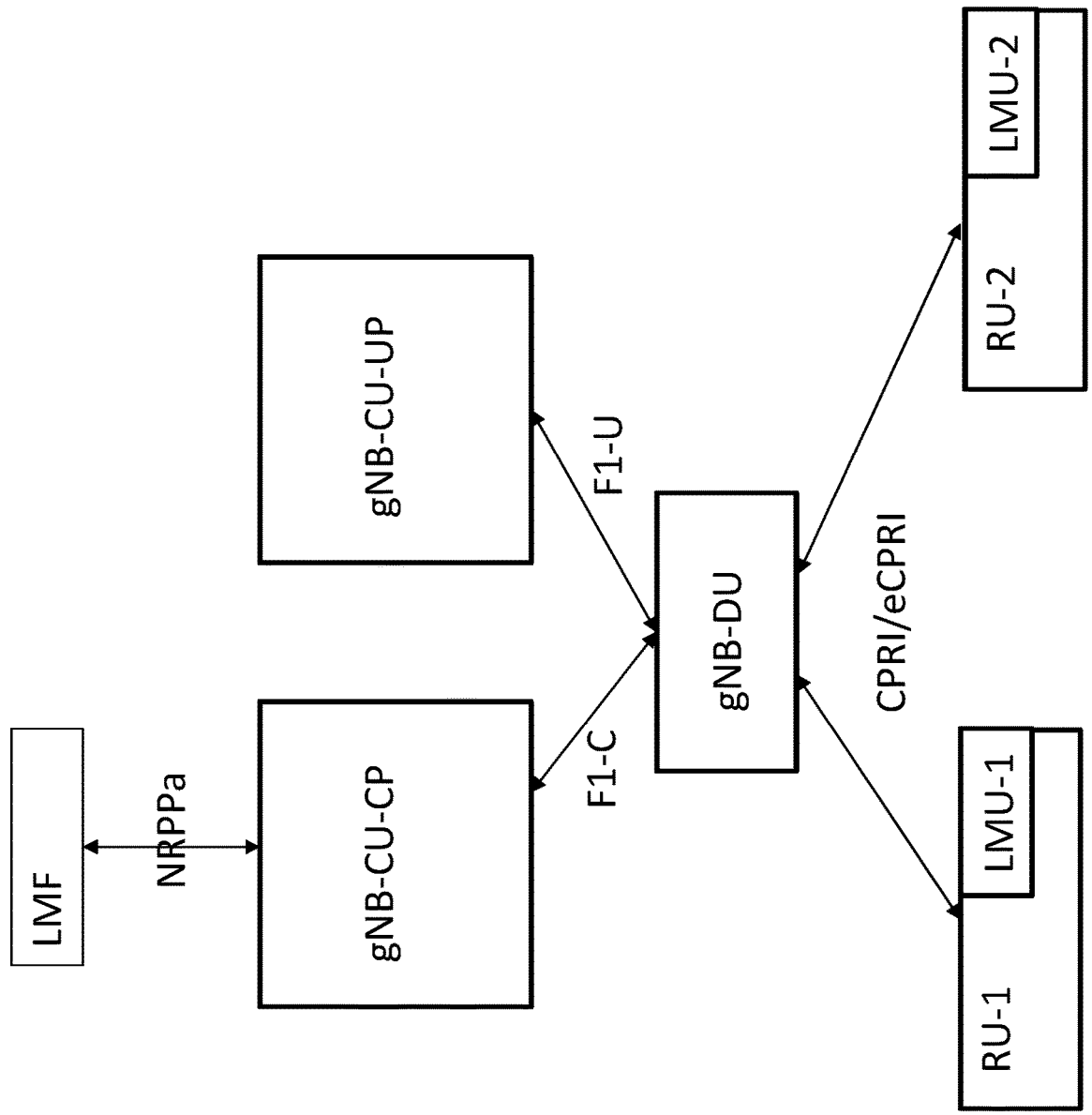
FIG. 9 shows a schematic diagram of NR architecture according to an example embodiment where the LMU is co-located with the DU.

FIG. 9 shows an example architecture where the RU/RRH comprise the LMUs. As in FIG. 8, RU-1 and RU-2 (and hence LMU-1 and LMU-2, respectively) communicate with the gNB-DU using CPRI/eCPRI. The gNB-DU communicates with the gNB-CU as described with reference to FIG. 8.

The same architecture may be used for both central and local (RAN based) LMF options. A local LMF within 5G-RAN is under active discussion. Although the LMF is shown as separate to the gNB-CU in FIGS. 8 and 9, with an NRPPa interface between the gNB-CU and the LMF, a local LMF within the gNB may also be used. The method is aligned to the local LMF architecture option. The measurement reports (comprising the results of the measurements) may be sent by local LMFs to the central LMF, in case of central LMF deployment. This solution may be favoured for low latency use cases.

Figure 10:
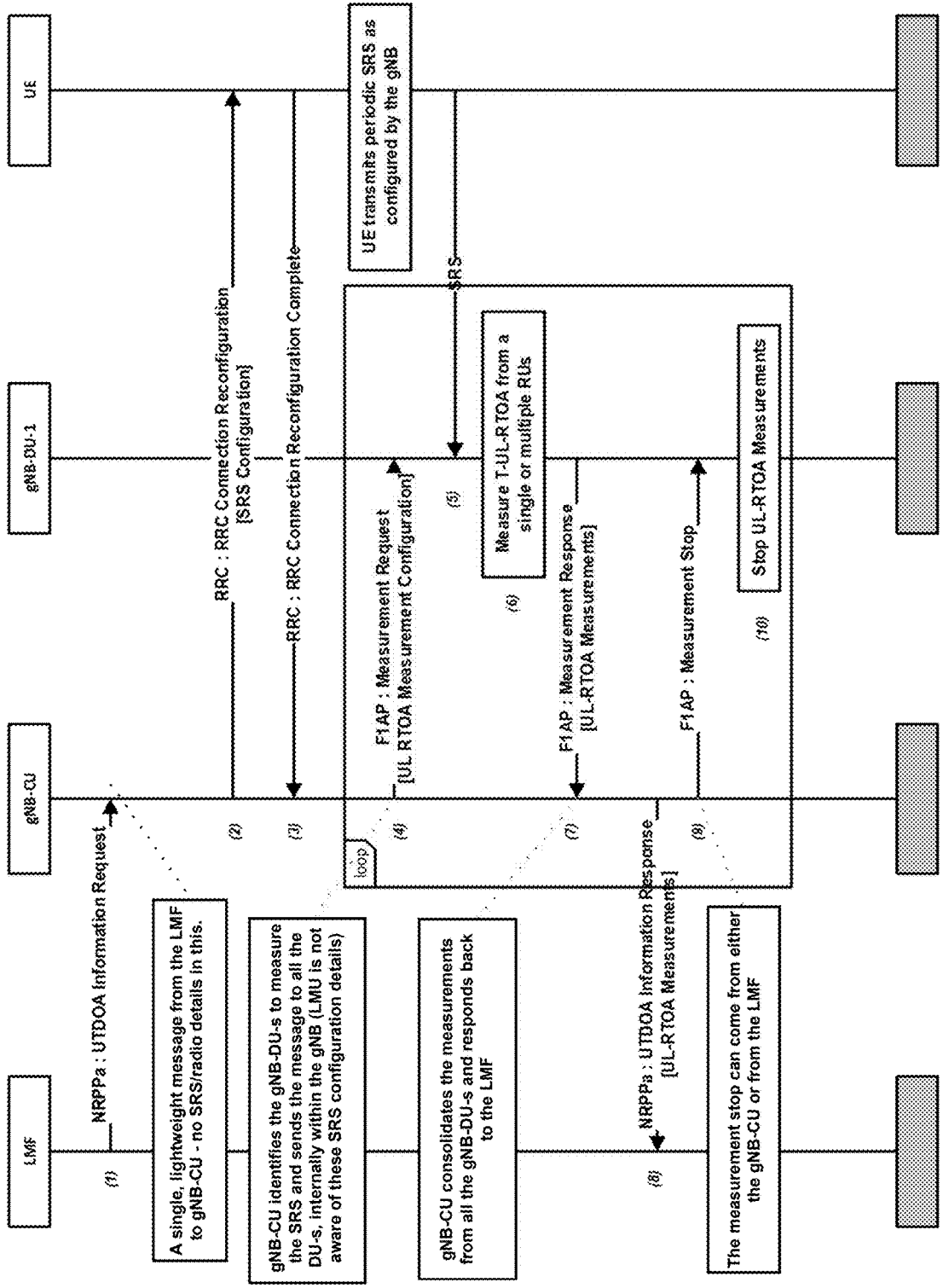
FIG. 10 shows a signalling diagram for uplink positioning according to an example embodiment.

FIG. 10 shows a signalling diagram for UL positioning based on UTDOA according to an example embodiment. In step 1, the LMF sends a UTDOA Information Request to a gNB-CU over NRPPa. THE UTDOA includes no SRS configuration details and so is a single, lightweight message on the NRPPa which replaces the SRS configuration request/response sent between the LMF and NG-RAN over NRPPa in legacy systems.

In step 2, the gNB-CU sends a RRC Connection Reconfiguration message to the UE which includes the SRS configuration. In step 3, the UE sends a RRC connection Reconfiguration Complete message. The UE then transmits periodic SRS as configured by the gNB.

In step 4, the gNB-CU sends a Measurement Request (which includes the UL RTOA Measurement Configuration) to the gNB-DU. The gNB-CU identifies the gNB-DUs to measure the SRS and sense the message to the DUs internally within the gNB (LMF is not aware of the SRS configuration details).

The gNB-DU receives a SRS from the UE in step 5 and measures the T-UL-RTOA from a single or multiple RUs in step 6. The gNB-DU sends a Measurement Response including the UL-RTOA Measurements to the gNB-CU in step 7.

The gNB consolidates the measurements from all the gNB-DUs and responds to the LMF. In step 8 the gNB-CU forwards the UL RTOA measurements to the LMF in a UTDOA Information Response over NRPPa. The gNB-CU then sends a Measurement stop message to the gNB-DU in step 8 over F1AP and the gNB-DU stops UL-RTOA Measurements in step 10. The measurement stop may be provided from the gNB-CU or the LMF.

The signaling flow described with reference to FIG. 10 may be applied in full to the case whether the LMF is a central LMF. Steps 1 and 8 of the signaling flow are not applicable in the case where the LMF is local to the gNB.

The proposal makes use of the inherent distributed nature of the 5G architecture. The architecture may be simplified compared to the architecture for UL positioning in LTE/EPC since it does not involve LMU/SLm and SLmAP.

Although the example in FIG. 10 was described with reference to UTDOA, it may be applied where other UL positioning methods are used. The UL positioning methods may involve distributed uplink signal (e.g. reference signal) measurements. The distributed UL signal measurements may relate to, for example and not limited to, other UL signal timings, UL angle of arrival, UL angle of departure, carrier-phase or RSRP.

UL positioning may become critical in certain 5G use cases such as factory/indoors/verticals. This incremental approach may be a cheaper option.

The method may be implemented in a user equipment as described with reference to FIG. 2 or a control apparatus as described with reference to FIG. 3.

An apparatus may comprise means for providing, to at least one distributed unit of a base station from a centralised unit of the base station, an indication to cause at least one measurement relating to an uplink signal from a user equipment to be performed, receiving an indication of a result of the at least one measurement from the at least one distributed unit; and providing an indication of the result of the at least one measurement to a location management function.

Alternatively, or in addition, an apparatus may comprise means for providing, to at least one distributed unit of a base station from a centralised unit of the base station, an indication to cause the at least one distributed unit to perform at least one measurement relating to an uplink signal from a user equipment, receiving an indication of a result of the at least one measurement from the at least one distributed unit and providing an indication of the result of the at least one measurement to a location management function.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where UL positioning is used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:
1. A centralized unit of a base station comprising:
at least one processor; and
at least one memory including computer program code;
the at least one memory and the computer program code configured to, with the at least one processor, cause the centralized unit at least to:

provide, to at least one distributed unit of the base station from the centralized unit, an indication to cause at least one measurement relating to an uplink signal from a user equipment to be performed, wherein the at least one measurement relating to the uplink signal is performed at a location management unit (LMU) connected to the distributed unit, wherein the uplink signal is transmitted periodically from the user equipment;

receive an indication of a result of the at least one measurement from the at least one distributed unit; and provide an indication of the result of the at least one measurement to a local location management function integral to the centralized unit of the base station;

wherein the local location management function is a central function and an interface between the local location management function and the centralized unit uses new radio positioning protocol A; and wherein the centralized unit is interfaced with a central location management function and an interface between the central location management function and the centralized unit uses the new radio positioning protocol A.

2. The centralized unit according to claim 1, wherein an interface between the centralized unit and the distributed unit uses an F1 application protocol.

3. The centralized unit according to claim 1, wherein the computer program code and the at least one processor are configured to cause the centralized unit to:
provide configuration information to at least one user equipment from the centralized unit.

4. The centralized unit according to claim 1, where the uplink signal is a reference signal or a physical channel.

5. The centralized unit according to claim 4, wherein the reference signal is a sounding reference signal.

6. The centralized unit according to claim 1, wherein the at least one measurement relates to uplink relative time of arrival for the uplink signal, uplink angle of departure for the uplink signal, uplink angle of arrival for the uplink signal, received uplink signal power and carrier-phase of the uplink signal.

7. The centralized unit of claim 1, wherein the centralized unit is further caused to transmit to the at least one distributed unit of the base station, a measurement stop message to cause stopping of the at least one measurement relating to the uplink signal from the user equipment.

8. A distributed unit of a base station comprising:
at least one processor; and
at least one memory including computer program code;
the at least one memory and the computer program code configured to, with the at least one processor, cause the distributed unit at least to:
receive, at the distributed unit from a centralized unit of the base station, an indication to cause at least one measurement relating to an uplink signal received from a user equipment to be performed, wherein the uplink signal is transmitted periodically from the user equipment;
cause at least one measurement relating to the uplink signal to be performed at a location management unit connected to the distributed unit; and
provide an indication of a result of the at least one measurement to the centralized unit for provision to a location management function that is integral to the centralized unit of the base station;
wherein the location management function is a central function and an interface between the location management function and the centralized unit uses new radio positioning protocol A.

9. The distributed unit according to claim 8, wherein the computer program code and the at least one processor are configured to cause the distributed unit to:
receive the result of the at least one measurement from a radio unit, a remote radio head or a standalone measurement unit.

10. The distributed unit according to claim 8, wherein an interface between the centralised centralized unit and the distributed unit uses an F1 application protocol.

11. The distributed unit according to claim 8, where the uplink signal is a reference signal or a physical channel.

12. The distributed unit according to claim 11, wherein the reference signal is a sounding reference signal.

13. The distributed unit according to claim 8, wherein the at least one measurement relates to uplink relative time of arrival for the uplink signal, uplink angle of departure for the uplink signal, uplink angle of arrival for the uplink signal, received uplink signal power and carrier-phase of the uplink signal.

14. The distributed unit of claim 8, wherein the distributed unit is further caused to:
receive from the centralized unit of the base station, a measurement stop message to cause stopping of the at least one measurement relating to the uplink signal from the user equipment; and
stop the at least one measurement relating to the uplink signal from the user equipment.

15. A method comprising:
providing, to at least one distributed unit of a base station from a centralized unit of the base station, an indication to cause the at least one distributed unit to perform at least one measurement relating to an uplink signal from a user equipment, wherein the at least one measurement relating to the uplink signal is performed at a location management unit (LMU) connected to the distributed unit, and wherein the uplink signal is transmitted periodically from the user equipment;
receiving an indication of a result of the at least one measurement from the at least one distributed unit; and
providing an indication of the result of the at least one measurement to a local location management function integral to the centralized unit of the base station;
wherein the local location management function is a central function and an interface between the local location management function and the centralized unit uses new radio positioning protocol A; and
wherein the centralized unit is interfaced with a central location management function and an interface between the central location management function and the centralized unit uses the new radio positioning protocol A.

16. A method comprising:
receiving, at a distributed unit of a base station from a centralized unit of the base station, an indication to cause at least one measurement relating to an uplink signal received from a user equipment to be performed, wherein the uplink signal is transmitted periodically from the user equipment;
causing at least one measurement relating to the uplink signal to be performed at a location management unit connected to the distributed unit; and
providing an indication of a result of the at least one measurement to the centralized unit for provision to a location management function that is integral to the centralized unit of the base station;

wherein the location management function is a central function and an interface between the location management function and the centralized unit uses new radio positioning protocol A.

* * * * *